(12) United States Patent
Shin

(10) Patent No.: US 8,505,996 B1
(45) Date of Patent: Aug. 13, 2013

(54) STORAGE BOX FOR AUTOMOBILE

(75) Inventor: Ju han Shin, Yongin-si (KR)

(73) Assignee: HYUNDAI MOBIS Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/560,011

(22) Filed: Jul. 27, 2012

(30) Foreign Application Priority Data

Mar. 19, 2012 (KR) .................. 10-2012-0027746
Mar. 19, 2012 (KR) .................. 10-2012-0027747
Jun. 19, 2012 (KR) .................. 10-2012-0065736

(51) Int. Cl.
*B60R 7/04* (2006.01)

(52) U.S. Cl.
USPC ............. 296/37.12; 296/37.8; 312/330.1

(58) Field of Classification Search
USPC ................ 296/37.12, 37.8; 312/330.1
See application file for complete search history.

(56) References Cited

U.S. PATENT DOCUMENTS 5,460,309 A * 10/1995 Nehl et al. .................. 224/281
6,241,300 B1 * 6/2001 Suzuki ........................ 296/37.8

* cited by examiner

*Primary Examiner* — Joseph Pape
(74) *Attorney, Agent, or Firm* — SHerr & Jiang, PLLC

(57) ABSTRACT

Disclosed is a storage box for an automobile, in which a box door opens upward. The storage box includes: a box housing defining a storage space, and including a gear bar disposed therein; a box door opening and closing the storage space, and including a first hinge point and a second hinge point below the first hinge point formed thereon; a bridge slidably disposed on the box housing and rotatably coupled to the first hinge point, to be slid by the box door when the box door is opened and closed; a supporting member rotatably coupled to the second hinge point; and a rotating body engaged with the gear bar and the supporting member and rotatably disposed on the bridge, moving along the bridge and rotating during sliding of the bridge, and enabling the supporting member to raise and support the box door.

13 Claims, 7 Drawing Sheets

STORAGE BOX FOR AUTOMOBILE

CROSS-REFERENCE TO RELATED APPLICATIONS

The present application claims priority to Korean Patent Application Number 10-2012-0027746 filed Mar. 19, 2012, 10-2012-0027747 filed Mar. 19, 2012 and 10-2012-0065736 filed Jun. 19, 2012, the entire contents of which application is incorporated herein for all purposes by this reference.

TECHNICAL FIELD

The present invention relates to a storage box for an automobile, and more particularly, to a storage box for an automobile installed on a crash pad disposed to the front of the passenger seat.

BACKGROUND

In general, an instrument panel is installed at the front inside an occupant compartment. The instrument panel is elongated laterally across the width of the automobile, the steering wheel and instrument cluster are mounted at the portion to the front of the driver's seat, and a passenger airbag device and a glove box are mounted at the portion to the front of a passenger seat.

The instrument panel includes a foam material capable of absorbing impacts, which absorbs impacts in the event that the automobile is involved in a collision, so as to minimize injury to the driver and the passenger from the instrument panel. In this aspect, the instrument panel may be called a crash pad.

The glove box is configured to include a glove box door defining a storage space in which items are stored, and a glove box housing on which a glove box door is hinge-coupled. After the crash pad is inserted and installed in the glove box housing, the bottom of the glove box door is hinge-coupled to the glove box housing. That is, the glove box door uses the hinge-coupled bottom thereof as a center of rotation, to thus form a structure in which the top thereof rotates toward the occupant compartment to open and rotates in reverse toward the housing to close.

In a glove box with such a structure, however, in order to prevent items stored in the storage space of the glove box door from spilling into the occupant compartment, the angle opening into the occupant compartment is restricted, which limits the size of items that can be stored in the storage space.

Therefore, a glove box has recently been developed that does not define the storage space in the glove box door, but defines the storage space in the glove box housing, so that the glove box door has only the function of opening and closing the storage space so that items stored in the storage space do not fall out. Thus, the storage space can be maximized and the opening angle of the glove box door can be increased, allowing various items to be stored. A glove box with such a structure can be called a multi box in light of the fact that a greater range of items can be stored than in conventional glove boxes.

However, in order to maximize the opening of the door, the multi box must have a groove formed on the crash pad at the bottom of the door to avoid interference, which presents the problem of restricting the interior design of the occupant compartment.

Also, because the center of the crash pad is formed with an inward curvature compared to both ends thereof in order to secure space inside the occupant compartment, the door must also be formed with a curvature that matches the curvature of the crash pad. When setting the amount of curvature for the door, a suitable curvature must be set in order for the door to smoothly rotate when the door is opened and closed, and thus, the setting of the curvature of the door is another limitation that presents a problem.

SUMMARY

The present invention has been made in an effort to provide a storage box for an automobile, which has a box door that opens upward.

Objects of the present invention are not limited to the object described above, and other objects that are not described will be clearly understood by a person skilled in the art from the description below.

An exemplary embodiment of the present invention provides a storage box for an automobile, including: a box housing defining a storage space, and including a gear bar disposed thereon; a box door opening and closing the storage space, and including a first hinge point and a second hinge point below the first hinge point formed thereon; a bridge slidably disposed on the box housing and rotatably coupled to the first hinge point, to be slid by the box door when the box door is opened and closed; a supporting member rotatably coupled to the second hinge point; and a rotating body engaged with the gear bar and the supporting member and rotatably disposed on the bridge, moving along the bridge and rotating during sliding of the bridge, and enabling the supporting member to raise and support the box door.

Details of other exemplary embodiments are included in the detailed description and the drawings.

With a storage box for an automobile according to the present invention, because the box door is withdrawn from the box housing and is opened upward, the box door does not interfere with the box housing and the peripheral parts of the box housing, so that the amount in which the box door can be opened is maximized.

Also, a supporting member supporting the box door is kept engaged with a rotating body, so that when the box door is opened, the supporting member can be smoothly withdrawn from the box housing and support the box door.

The effects of the present invention are not limited to the effects described above, and a person of ordinary skill in the art will clearly understand other effects that are not described above from the description of the scope of the claims.

DETAILED DESCRIPTION

Figure 1:
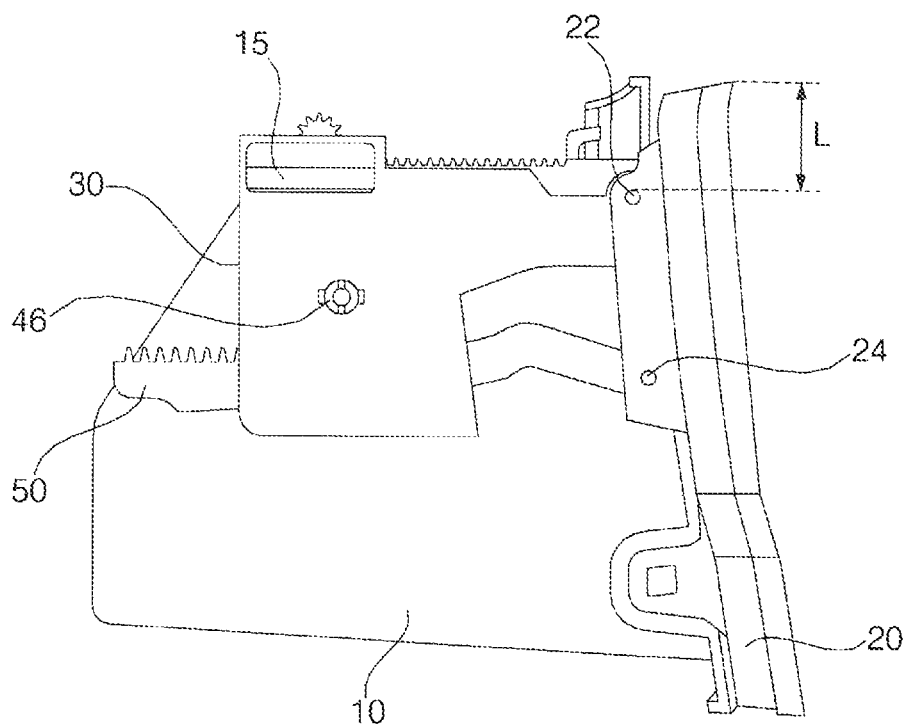
FIG. 1 is a diagram illustrating a closed state of a storage box for an automobile according to an exemplary embodiment of the present invention.

The advantages and characteristics of the present invention and methods for achieving the same will become clear from the embodiments set forth in detail below with reference to the attached drawings. However, the present, invention is not limited to the embodiments set forth below, and may be embodied in various other forms. The present embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals represent like elements throughout the specification.

Hereinafter, a storage box for an automobile according to exemplary embodiments of the present invention will be described in more detail with reference to the drawings.

Figure 2:
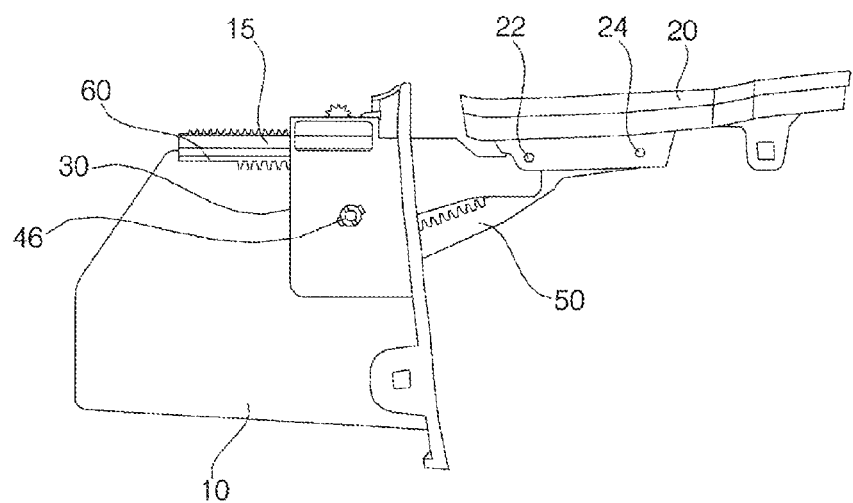
FIG. 2 is a diagram illustrating an open state of a storage box for an automobile according to an exemplary embodiment of the present invention.
Figure 3:
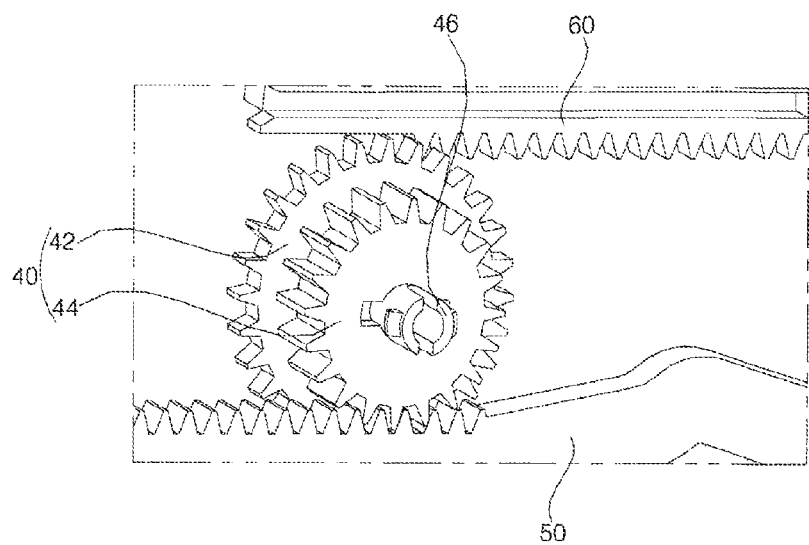
FIG. 3 is a diagram illustrating a gear bar, a rotating body, and a supporting member included in a storage box for an automobile according to an exemplary embodiment of the present invention.

FIG. 1 is a diagram illustrating a closed state of a storage box for an automobile according to an exemplary embodiment of the present invention, FIG. 2 is a diagram illustrating an open state of a storage box for an automobile according to an exemplary embodiment of the present invention, and FIG. 3 is a diagram illustrating a gear bar, a rotating body, and a supporting member included in a storage box for an automobile according to an exemplary embodiment of the present invention.

Referring to FIGS. 1 to 3, a storage box for an automobile according to an exemplary embodiment of the present invention includes: a box housing 10 inserted and installed in a crash pad (not illustrated) disposed to the front of the passenger seat of the automobile, and defining a storage space that is empty inside in which items are stored; a box door 20 for opening and closing the storage space; a bridge 30 slidably disposed on the box housing 10, connected to the box door 20, and slid by the box door 20 when the box door 20 is opened and closed; a rotating body 40 rotatably disposed on the bridge 30, and moving along the bridge 30 when the bridge 30 is slid; and a supporting member 50 engaged with the rotating body 40 and connected to the box door 20, moving along the rotating body 40 when the box door 20 is opened and closed, and supporting the box door 20.

The box door 20 is rotatably coupled to the bridge 30 and the supporting member 50, and opens upward. A first hinge point 22 is formed at the upper portion of the inner side on the box door 20 so that the box door 20 may be rotatably coupled to the bridge 30 and the supporting member 50, and a second hinge point 24 is formed separated downward from the first hinge point 22 at around the center of the inner side. One end of the bridge 30 is rotatably coupled to the first hinge point 22, and one end of the supporting member 50 is separated downward from the end of the bridge 30 and is rotatably coupled to the second hinge point 24.

The bridge 30 is connected to a damper (not illustrated) disposed at the top of the box housing 10, and may be resiliently slid by means of the resilience of the damper when the box door 20 is opened and closed. A guider 15 for guiding the sliding movement of the bridge 30 is formed on the side of the box housing 10, and the bridge 30 may be guided by the guider 15 and slid during opening and closing of the box door 20. The guider 15 may be integrally formed with the box housing 10 during injection molding of the box housing 10, or may be formed as a separate item from the box housing 10 and assembled to the box housing 10 after the box housing 10 is injection molded.

The bridge 30 is guided by the guider 15 and slid when the box door 20 is opened so that a portion thereof is withdrawn from the box housing 10, and is slid in the reverse direction and reinserted into the box housing 10 when the box door 20 is closed.

The supporting member 50 also moves with the rotating body 40 when the box door 20 is opened so that a portion thereof is withdrawn from the box housing 10, and moves in the reverse direction so as to be reinserted into the box housing 10 when the box door 20 is closed.

Accordingly, when opened upward, the box door 20 is withdrawn from the box housing 10 by the bridge 30 and the supporting member 50 withdrawn from the box housing 10, and opens upward by rotating about the first hinge point 22 and the second hinge point 24.

Because the box door 20 is withdrawn from the box housing 10 and opened upward, as illustrated in FIG. 2, the top of the box door 20 is separated from the box housing 10, so that the top of the box door 20 does not interfere with the box housing 10 and the crash pad on which the box housing 10 is mounted, thereby allowing the amount in which the box door 20 may be opened to be maximized.

A gear bar 60, on which gear teeth are formed to engage with the rotating body 40, is disposed on the box housing 10 so that the rotating body 40 may be rotated during sliding of the bridge 30.

The gear bar 60 is formed straight and fixed and coupled along the front to rear on the side at the upper portion of the box housing 10, and has gear teeth formed on the bottom thereof, which engage with the rotating body 40.

The supporting member 50 is separated downward from the gear bar 60 and disposed along the front to rear on the side at the bottom of the box housing 10, and has gear teeth formed on the top thereof, which engage with the rotating body 40.

The rotating body 40 is disposed between the gear bar 60 and the supporting member 50, and has gear teeth formed on the circumference thereof to be engaged with the gear teeth formed on the gear bar 60 and the gear teeth formed on the supporting member 50. That is, in terms of the engaging structure of a typical rack and pinion gear, the gear bar 60 and the supporting member 50 perform the function of the rack gear, and the rotating body 40 performs the function of the pinion gear.

The rotating body 40 in the present exemplary embodiment is formed as a two-tiered gear structure having mutually different diameters. That is, the rotating body 40 includes a first gear 42 formed with a large diameter, and a second gear 44 formed with a diameter smaller than the first gear 42 and coupled in an axial direction to the first gear 42. The first gear 42 has gear teeth formed thereon that are engaged with the gear teeth formed on the gear bar 60, and the second gear 44 has gear teeth formed thereon that are engaged with the gear teeth formed on the supporting member 50.

The first gear 42 is formed with a large diameter, the second gear 44 is formed with a diameter smaller than the first gear 42, the two gears are fixed and coupled to each other by means of a rotation shaft 46, and the rotation shaft 46 is rotatably coupled to the bridge 30. That is, the first gear 42 and the second gear 44 are formed with mutually different diameters, and rotate at the same angle. For example, if the first gear 42 rotates one revolution, the second gear 44 rotates together with the first gear 42 for one revolution. Thus, while the first gear 42 and the second gear 44 rotate at the same angle, because the diameters thereof are different, the supporting member 50 is withdrawn from the box housing 10 more quickly than the bridge 30 so that the box door 20 may open upward.

Figure 4:
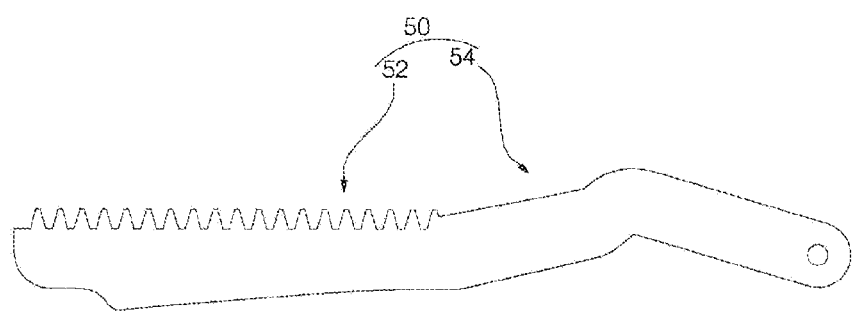
FIG. 4 is a side view illustrating the supporting member illustrated in FIGS. 1 to 3.
Figure 5:
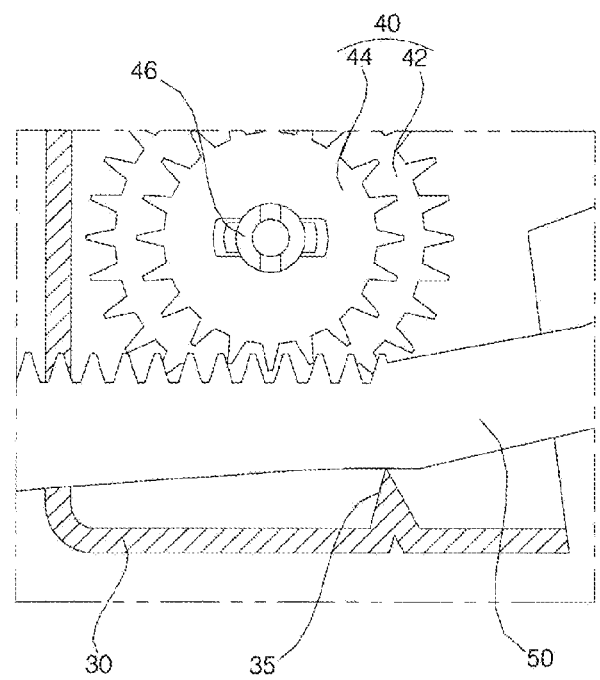
FIG. 5 is a diagram illustrating the position of a supporting member in a closed state in a storage box for an automobile according to an exemplary embodiment of the present invention.
Figure 6:
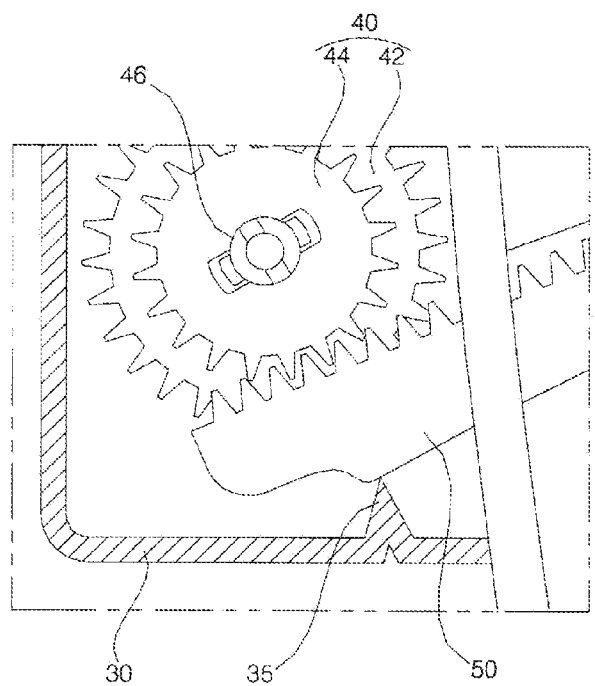
FIG. 6 is a diagram illustrating the position of a supporting member in an open state in a storage box for an automobile according to an exemplary embodiment of the present invention.

FIG. 4 is a side view illustrating the supporting member illustrated in FIGS. 1 to 3, FIG. 5 is a diagram illustrating the position of a supporting member in a closed state of a storage box for an automobile according to an exemplary embodiment of the present invention, and FIG. 6 is a diagram illustrating the position of a supporting member in an open state of a storage box for an automobile according to an exemplary embodiment of the present invention.

Referring to FIGS. 1 to 6, in order for the supporting member 50 to be kept in engagement with the rotating body 40 when the box door 20 is opened and closed, the thickness of the supporting member 50 progressively increases toward one end thereof, so that the bottom is supported by the bridge 30. That is, the supporting member 50 is in a virtually horizontal state when the box door 20 is closed, as illustrated in FIG. 1, and is withdrawn from the box housing 10 to a tilted disposition when the box door 20 is opened, as illustrated in FIG. 2. Thus, during the opening of the box door 20, because there is the possibility of the supporting member 50 descending and disengaging from the rotating body 40, the bottom of the supporting member 50 at the side opposite to that engaged with the rotating body 40 is formed with a slope, and the supporting member 50 is formed such that the thickness thereof progressively increases toward one end thereof. Therefore, the supporting member 50 is smoothly withdrawn from the box housing 10 when the box door 20 is opened, and is able to support the box door 20.

The supporting member 50 includes a gear unit 52 on which gear teeth are formed to be engaged with the rotating body 40, and a coupling unit 54 extending from the gear unit 52, bent at least once, and rotatably coupled to the second hinge point 24 of the box door 20. The bottom of the gear unit 52 is formed with a slope so that the gear unit 52 progressively increases in thickness toward the end thereof, and the coupling unit 54 is disposed toward the inside of the box door 20 when the box door 20 is in an open state, so as to support and prevent the box door 20 from dropping.

In order to maintain the supporting member 50 in engagement with the rotating body 40 when the box door 20 is opened and closed, a supporting protrusion 35 is formed protruding on the bridge 30 to support the supporting member 50. The supporting protrusion 35 supports the bottom of the gear unit 52 formed with a slope, so that when the supporting member 50 is withdrawn from or reinserted into the box housing 10, the engagement between the supporting member 50 and the rotating body 40 may be maintained, thereby enabling the supporting member 50 to be smoothly withdrawn from the box housing 10 and to support the box door 20 when the box door 20 is opened.

Because the box door 20 is opened upward, the upper portion of the box door 20 must not interfere with the box housing 10 when the box door 20 is opened and closed. Accordingly, there is a need to set the length L of the upper portion of the box door 20 from the first hinge point 22 illustrated in FIG. 1 as a starting point, so that when opened and closed, the box door 20 does not interfere with the box housing 10. This will be described below with reference to FIG. 7.

Figure 7:
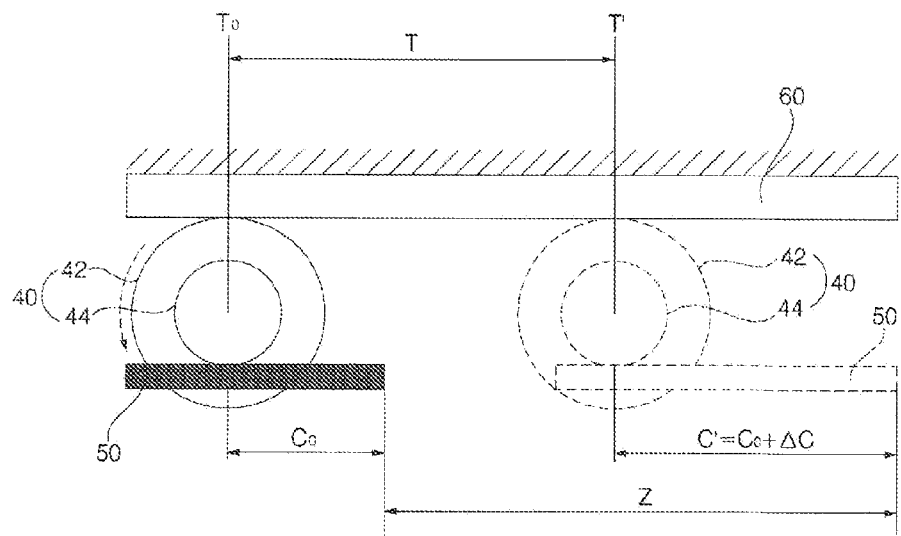
FIG. 7 is a diagram illustrating the amount of change in length during the linear movement of a supporting member in a storage device for an automobile according to an exemplary embodiment of the present invention.

FIG. 7 is a diagram illustrating the amount of change in length during the linear movement of a supporting member in a storage device for an automobile according to an exemplary embodiment of the present invention.

Referring to FIG. 7, when the box door 20 is in a closed state, the rotating body 40 is in a position $T_0$, and when a user pulls on the box door 20 to open the box door 20, the bridge 30 is withdrawn from the box housing 10, and the rotating body 40 rotatably disposed on the bridge 30 moves along the bridge 30, so that when the box door 20 is completely opened, the rotating body 40 is in a position T'.

Thus, because the rotating body 40 is disposed on the bridge 30, the straight line length when the bridge 30 is pulled by the box door 20 and withdrawn from the box housing 10 is the same as an amount of displacement T by which the first gear 42 is rotated and moved in a straight line along the gear bar 60.

Therefore the straight line length T by which the bridge 30 is withdrawn from the box housing 10 follows [Equation 1] below.

$$T = \pi D_1 \cdot x \qquad \text{[Equation 1]}$$

In [Equation 1] above, $D_1$ is the diameter of the first gear 42, and x is the number of revolutions of the first gear 42.

[Equation 2] below may be derived from [Equation 1] above.

$$x = \frac{T}{\pi D_1} \qquad \text{[Equation 2]}$$

If the effective length of the supporting member 50 is $C_0$ when the rotating body 40 is in the position $T_0$, the final effective length C' of the supporting member 50 follows [Equation 3] below when the rotating body 40 is in the position T'.

$$C' = C_0 + \Delta C \qquad \text{[Equation 3]}$$

In [Equation 3] above, $\Delta C$ is an amount of increase in the effective length of the supporting member 50.

The amount of increase $\Delta C$ in the effective length of the supporting member 50 follows [Equation 4] below.

$$\Delta C = \pi D_2 \cdot x \qquad \text{[Equation 4]}$$

In [Equation 4] above, $D_2$ is the diameter of the second gear 44, and x is the number of revolutions of the second gear 44.

However, as the first gear 42 and the second gear 44 rotate together at the same angle, [Equation 2] may be substituted for [Equation 4] to derive [Equation 5] below.

$$\Delta C = \pi D_2 \times \frac{T}{\pi D_1} = \frac{D_2}{D_1} T \qquad \text{[Equation 5]}$$

Also, if a straight line length of the supporting member 50 withdrawn from the box housing 10 is Z, when considering the amounts of displacement as illustrated in FIG. 7, [Equation 6] below should be derived.

$$C_0 + Z = T + C' \quad \text{[Equation 6]}$$

If [Equation 3] is substituted for [Equation 6] above, [Equation 7] below may be derived.

$$C_0 + Z = T + C_0 + \Delta C \quad \text{[Equation 7]}$$

If [Equation 5] is substituted for [Equation 7] above, [Equation 8] below may be derived.

$$C_0 + Z = T + C_0 + \frac{D_2}{D_1} T \quad \text{[Equation 8]}$$

The straight line length Z of the supporting member 50 withdrawn from the box housing 10, obtained through [Equation 8] above may be summarized by [Resultant Equation 1] below.

$$Z = T\left(1 + \frac{D_2}{D_1}\right) \quad \text{[Resultant Equation 1]}$$

Because the box door 20 is opened and closed to satisfy [Resultant Equation 1] above, the length L of the upper portion of the box door 20 from the first hinge point 22 as the starting point should be determined such that the upper portion of the box door 20 does not interfere with the box housing 10, in order to satisfy the conditions of [Resultant Equation 1] above.

However, when the box door 20 is opened, the supporting member 50 not only moves in a straight line from the box housing 10, but also rotates to allow the box door 20 to be opened upward. The amount of change in length during the rotational movement of the supporting member 50 will be described with reference to FIG. 8.

Figure 8:
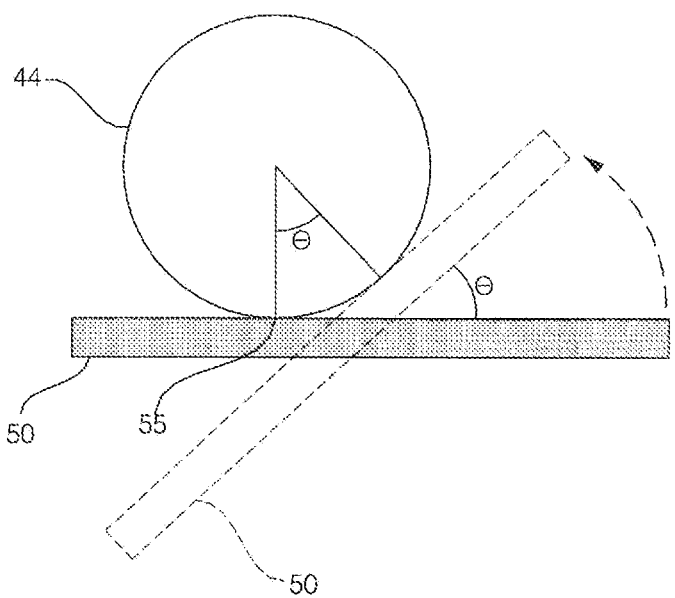
FIG. 8 is a diagram illustrating the amount of change in length during the rotational movement of a supporting member in a storage device for an automobile according to an exemplary embodiment of the present invention.

FIG. 8 is a diagram illustrating the amount of change in length during the rotational movement of a supporting member in a storage device for an automobile according to an exemplary embodiment of the present invention.

Referring to FIG. 8, if the point at which the supporting member 50 contacts the second gear 44 is a third hinge point 55, the supporting member 50 maintains contact with the second gear 44 by means of the third hinge point 55 and rotates upward by a rotation angle θ of the second gear 44 so that the box door 20 may be opened upward. That is, if the rotational angle by which the supporting member 50 is rotated upward about the third hinge point 55 when the supporting member 50 is withdrawn from the box housing 10 is θ, then the reduced amount $\Delta C_2$ of effective length of the supporting member 50 follows [Equation 9] below.

$$\Delta C_2 = \pi D_2 \times \frac{\theta}{360} \quad \text{[Equation 9]}$$

In reality, when withdrawn from the box housing 10, the supporting member 50 performs a combination of the straight line movement in FIG. 7 and the rotational movement in FIG. 8, so that the actual final effective length $C_1$ of the supporting member 50 follows [Equation 10] below.

$$C_1 = C_0 + \frac{D_2}{D_1} T - \left(\pi D_2 \times \frac{\theta}{360}\right) \quad \text{[Equation 10]}$$

Figure 9:
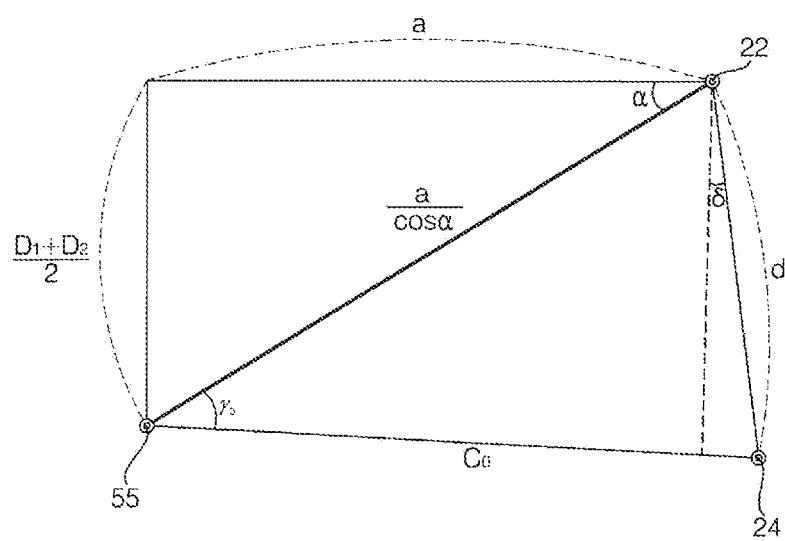
FIG. 9 is a mimetic diagram of a box door of a storage device for an automobile according to an exemplary embodiment of the present invention in a closed state.
Figure 10:
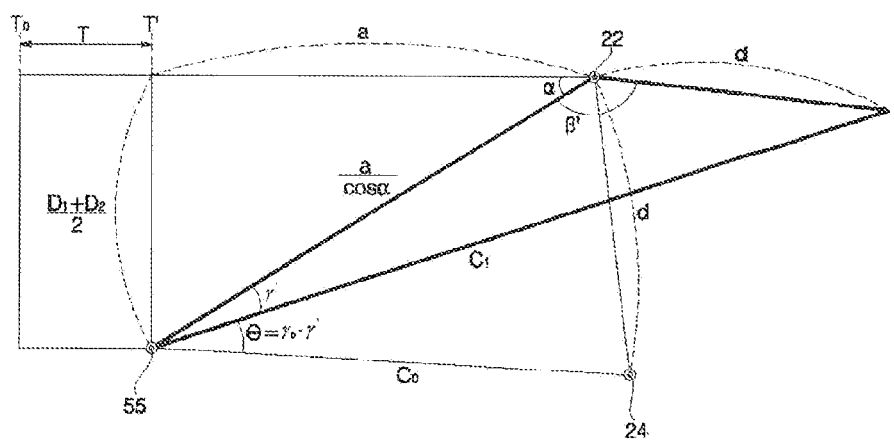
FIG. 10 is a mimetic diagram of a box door of a storage device for an automobile according to an exemplary embodiment of the present invention in an open state.

FIG. 9 is a mimetic diagram of a box door of a storage device for an automobile according to an exemplary embodiment of the present invention in a closed state, and FIG. 10 is a mimetic diagram of a box door of a storage device for an automobile according to an exemplary embodiment of the present invention in an open state.

As illustrated in FIG. 9, when the box door 20 is in a closed state, if the effective length of the supporting member 50 is $C_0$, if the straight line distance between the first hinge point 22 and the second hinge pint 24 is d, and if the effective length of the bridge 30 is a, then when the box door 20 is in an open state as illustrated in FIG. 10, the actual final effective length $C_1$ of the supporting member 50 follows [Equation 11] below.

$$\begin{aligned} C_1 &= \frac{a}{\cos\alpha} \cdot \cos\gamma' + d \cdot \cos(180 - (\beta' + \gamma')) \\ &= \frac{a}{\cos\alpha} \cdot \cos\gamma' - d \cdot \cos(\beta' + \gamma') \\ &= a \cdot \frac{\cos\gamma'}{\cos\alpha} - d \cdot \cos(\beta' + \gamma') \end{aligned} \quad \text{[Equation 11]}$$

In [Equation 11] above: α is an angle between a straight line connecting the first hinge point 22 and the third hinge point 55, and the bridge 30; β' is an angle between the straight line connecting the first hinge point 22 and the third hinge point 55, and a straight line connecting the first hinge point 22 and the second hinge point 24; and γ is an angle between a straight line connecting the first hinge point 22 and the third hinge point 55, and the supporting member 50.

Accordingly, when [Equation 11] above is substituted for [Equation 10], [Equation 12] below may be derived.

$$a \cdot \frac{\cos\gamma'}{\cos\alpha} - d \cdot \cos(\beta' + \gamma') = C_0 + \frac{D_2}{D_1} T - \left(\pi D_2 \times \frac{\theta}{360}\right) \quad \text{[Equation 12]}$$

[Equation 12] above may be summarized to derive [Equation 13] below.

$$d \cdot \cos(\beta' + \gamma') = a \cdot \frac{\cos\gamma'}{\cos\alpha} - \left(C_0 + \frac{D_2}{D_1} T - \left(\pi D_2 \times \frac{\theta}{360}\right)\right) \quad \text{[Equation 13]}$$

When the box door 20 is in a closed state as illustrated in FIG. 9, if an angle between the straight line connecting the first hinge point 22 and the third hinge point 55, and the supporting member 50 is said to be $\gamma_0$, when the supporting member 50 is rotated upward by a rotational angle θ to put the box door 20 in an open state as illustrated in FIG. 10, the angle between the straight line connecting the first hinge point 22 and the third hinge point 55, and the supporting member 50 becomes γ'. Accordingly, the rotational angle θ of the supporting member 50 may be expressed by [Equation 14] below.

$$\theta = \gamma_0 - \gamma' \quad \text{[Equation 14]}$$

If [Equation 14] is substituted for [Equation 13] above, and transformed with an inverse function, [Equation 15] below may be derived.

$$\beta' + \gamma' = \cos^{-1} \frac{a \cdot \frac{\cos\gamma'}{\cos\alpha} - \left(C_0 + \frac{D_2}{D_1}T - \left(\pi D_2 \times \frac{\gamma_0 - \gamma'}{360}\right)\right)}{d} \quad \text{[Equation 15]}$$

If the box door 20 is maximally opened, and an angle between a straight line connecting the first hinge point 22 and the second hinge point 24, and the straight line connecting the first hinge point 22 and the third hinge point 55 becomes $\beta'=\pi$, here, the angle $\gamma'$ between the straight line connecting the first hinge point 22 and the third hinge point 55, and the supporting member 50 converges to 0. Accordingly, [Equation 15] above may be expressed as [Equation 16] below.

$$\beta' = \cos^{-1} \frac{\frac{a}{\cos\alpha} - \left(C_0 + \frac{D_2}{D_1}T - \left(\pi D_2 \times \frac{\gamma_0}{360}\right)\right)}{d} = \pi \quad \text{[Equation 16]}$$

[Equation 16] above may be expressed as [Equation 17] below through an arc cosine graph.

$$\frac{\frac{a}{\cos\alpha} - \left(C_0 + \frac{D_2}{D_1}T - \left(\pi D_2 \times \frac{\gamma_0}{360}\right)\right)}{d} = -1 \quad \text{[Equation 17]}$$

[Equation 17] above may be summarized to derive [Resultant Equation 2] below.

$$\frac{a}{\cos\alpha} + d = \left(C_0 + \frac{D_2}{D_1}T - \frac{\gamma_0}{360} \cdot \pi D_2\right) \quad \text{[Resultant Equation 2]}$$

Because the box door 20 performs opening and closing to satisfy [Resultant Equation 2] above, the length L of the upper portion of the box door 20 from the first hinge point 22 as the starting point should be determined to satisfy [Resultant Equation 2] above so that the upper portion of the box door 20 does not interfere with the box housing 10.

That is, if the effective length of the supporting member 50 is $C_0$, with the box door 20 in a closed state as illustrated in FIG. 9, when the box door 20 is opened as illustrated in FIG. 10 and the rotating body 40 moves in position from position $T_0$ to position T', the supporting member 50 rotates upward by the rotational angle θ and is withdrawn from the box housing 10. Thus, in order for the upper portion of the box door 20 to not receive interference from the box housing 10 and be maximally opened, the length L of the upper portion of the box door 20 from the first hinge point 22 as the starting point, as illustrated in FIG. 1, should be determined to satisfy [Resultant Equation 2] above so that the upper portion of the box door 20 does not interfere with the box housing 20.

Figure 11:
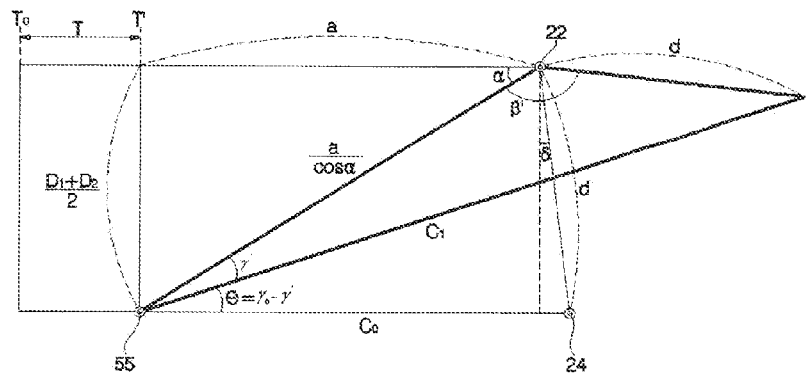
FIG. 11 is a mimetic diagram of a box door of a storage device for an automobile according to another exemplary embodiment of the present invention in an open state.

As illustrated in FIG. 9, the straight line connecting the first hinge point 22 and the second hinge point 24 is formed at a tilt of δ with respect to the first hinge point 22. If, as illustrated in FIG. 11, the bridge 30 and the supporting member 50 are disposed in parallel when the box door 20 is closed, [Equation 18] below is established.

$$d \cdot \cos\delta = \frac{D_1 + D_2}{2} \quad \text{[Equation 18]}$$

[Equation 18] above may be summarized to derive [Equation 19] below.

$$d = \frac{D_1 + D_2}{2\cos\delta} \quad \text{[Equation 19]}$$

If [Equation 19] is substituted for [Resultant Equation 2] above, [Equation 20] below may be derived.

$$\frac{a}{\cos\alpha} + \frac{D_1 + D_2}{2\cos\delta} = \left(C_0 + \frac{D_2}{D_1}T - \frac{\gamma_0}{360} \cdot \pi D_2\right) \quad \text{[Equation 20]}$$

Also, with reference to FIG. 11, [Equation 21] below is established.

$$\frac{D_1 + D_2}{2} = a\tan\alpha \quad \text{[Equation 21]}$$

Also, if the bridge 30 and the supporting member 50 are disposed in parallel when the box door 20 is in a closed state, the angle α between the straight line connecting the first hinge point 22 and the third hinge point 55, and bridge 30, and the angle $\gamma_0$ between the straight line connecting the first hinge point 22 and the third hinge point 55, and the supporting member 50 are alternate interior angles and the same.

If $\gamma_0$ is replaced with α in [Equation 20] above, which is substituted with [Equation 21] above, [Resultant Equation 3] below may be derived.

$$\frac{a}{\cos\alpha} + a \cdot \frac{\tan\alpha}{\cos\delta} = \left(C_0 + \frac{D_2}{D_1}T - \frac{\alpha}{360} \cdot \pi D_2\right) \quad \text{[Resultant Equation 3]}$$

Specifically, when the box door 20 is maximally opened, an angle between the straight line connecting the first hinge point 22 and the second hinge point 24, and the straight line connecting the first hinge point 22 and the third hinge point 55 becomes $\beta'=\pi$, and the straight line connecting the first hinge point 22 and the second hinge point 24 is formed at a slope angle of δ with respect to the first hinge point 22, if the bridge 30 and the supporting member 50 are disposed in parallel when the box door 20 is in a closed state, because the box door 20 is opened and closed to satisfy [Resultant Equation 3] above, the length L of the upper portion of the box door 20 from the first hinge point 22 as the starting point should be determined to satisfy [Resultant Equation 3] above so that the upper portion of the box door 20 does not interfere with the box housing 10.

If it is additionally posited that the diameter $D_1$ of the first gear 42 and the diameter $D_2$ of the second gear 44 are the same as D, [Equation 21] above may be expressed as [Equation 22] below, and [Resultant Equation 3] above may be expressed as [Equation 23] below.

$$D = a\tan\alpha \quad \text{[Equation 22]}$$

$$\frac{a}{\cos\alpha} + a \cdot \frac{\tan\alpha}{\cos\delta} = \left(C_0 + T - \frac{\alpha}{360} \cdot \pi D\right) \quad \text{[Equation 23]}$$

If [Equation 22] above is substituted for [Equation 23] above and then summarized, [Resultant Equation 4] below may be derived.

$$a - (C_0 + T) \cdot \cos\alpha + \frac{a\pi}{360} \cdot \alpha \cdot \sin\alpha + a \cdot \frac{\sin\alpha}{\cos\delta} = 0 \qquad \text{[Resultant Equation 4]}$$

In [Resultant Equation 4] above, because a is the effective length of the bridge 30 and $C_0$ is the effective length of the supporting member 50, and is the straight line length by which the bridge 30 is withdrawn from the box housing 20 which is the length by which the rotating body 40 is moved in a straight line, and δ is the slope angle of the straight line length connecting the first hinge point 22 and the second hinge point 24, these values are constants because they are set in the layout. Accordingly α may be obtained from [Resultant Equation 4] above. If α is thus obtained, the diameter of the rotating body 40 may be obtained through [Equation 22] above.

Specifically, when the box door 20 is maximally opened, the angle between the straight line connecting the first hinge point 22 and the second hinge point 24, and the straight line connecting the first hinge point 22 and the third hinge point 55 becomes β'=π, and the straight line connecting the first hinge point 22 and the second hinge point 24 is formed tilted by a slope angle of δ with respect to the first hinge point 22, and when the box door 20 is in a closed state, the bridge 30 and the supporting member 50 are disposed in parallel, and if the diameter $D_1$ of the first gear 42 and the diameter $D_2$ of the second gear 44 are the same as D, because the box door 20 is opened and closed to satisfy [Resultant Equation 4] above, the diameter D of the rotating body 40 may be determined to satisfy [Resultant Equation 4] above so that the upper portion of the box door 20 does not interfere with the box housing 10.

The effects of the storage box for an automobile according to an exemplary embodiment of the present invention as configured above will be described below.

First, with the box door 20 in a closed state as illustrated in FIG. 1, in order to open the box door 20 as illustrated in FIG. 2, a user grasps and pulls the box door 20. A knob (not illustrated) may be disposed at the upper portion on the front of the box door 20 for the user to grasp and pull the box door 20.

Thus, when the user grasps and pulls without lifting the box door 20, the box door 20 is opened upward. That is, when the box door 20 is pulled, the bridge 30 is guided by the guider 15 and slid and withdrawn from the box housing 10, whereupon the rotating body 40 disposed on the bridge 30 moves along the bridge 30 and operates the supporting member 50 to be withdrawn from the box housing 10.

Because the rotating body 40 is engaged with the gear teeth formed on the gear bar 60 and the gear teeth formed on the supporting member 50, when the bridge 30 is withdrawn from the box housing 10, the rotating body 40 is rotated and withdraws the supporting member 50 from the box housing 10.

While being supported by the supporting protrusion 35 formed on the bridge 30 so as to be maintained in engagement with the rotating body 40, the supporting member 50 is withdrawn from the box housing 10 and disposed at a tilt, in order to support the box door 20 and enable the box door 20 to be opened upward.

Thus, even when the supporting member 50 is withdrawn from the box housing 10 and disposed at a tilt, because the supporting member 50 is formed to have a thickness that progressively increases toward an end thereof, the supporting member 50 is always supported by the supporting protrusion 35 so that the engaged state thereof with the rotating body 40 may be maintained.

As described above, with a storage box for an automobile according to the present invention, because the box door 20 is withdrawn from the box housing 10 and opens upward, the box door 20 does not interfere with the box housing 10 or peripheral parts of the box housing 10, and the opened amount of the box door 20 is maximized.

Also, the supporting member 50 supporting the box door 20 is maintained in engagement with the rotating body 40, so that when the box door 20 is opened, the supporting member 50 may be smoothly withdrawn from the box housing 10 and support the box door 20.

Those having ordinary skill in the technical field to which the present invention pertains will understand that without modifying the technical spirit or the required characteristics thereof, the present invention may be embodied in other specific forms. Thus, the embodiments described above are exemplary in all aspects, and should be understood as not being limited. The scope of the present invention shall be defined by the scope of the patent claims set forth below rather than by the detailed description above, and all modifications or modified forms derived from the meaning and the scope of the patent claims and from equivalent concepts thereof shall be interpreted as falling within the scope of the present invention.

What is claimed is:

1. A storage box for an automobile, comprising:
   a box housing defining a storage space, and including a gear bar disposed thereon;
   a box door opening and closing the storage space, and including a first hinge point and a second hinge point below the first hinge point formed thereon;
   a bridge slidably disposed on the box housing and rotatably coupled to the first hinge point, to be slid by the box door when the box door is opened and closed;
   a supporting member rotatably coupled to the second hinge point; and
   a rotating body engaged with the gear bar and the supporting member and rotatably disposed on the bridge, moving along the bridge and rotating during sliding of the bridge, and enabling the supporting member to raise and support the box door.

2. The storage box for an automobile of claim 1, wherein the rotating body includes:
   a first gear engaged with the gear bar; and
   a second gear coupled in an axial direction to the first gear and engaged with the supporting member.

3. The storage box for an automobile of claim 2, wherein the first gear and the second gear are formed with mutually different diameters, and rotate at the same angle.

4. The storage box for an automobile of claim 2, wherein a length of an upper portion of the box door from the first hinge point as a starting point, is determined to satisfy [Resultant Equation 1] below, such that the upper portion of the box door is prevented from interfering with the box housing $$Z = T\left(1 + \frac{D_2}{D_1}\right) \qquad \text{[Resultant Equation 1]}$$

where Z is a straight line length of the supporting member withdrawn from the box housing,
T is a straight line length of the bridge withdrawn from the box housing, $D_1$ is a diameter of the first gear, and
$D_2$ is a diameter of the second gear.

5. The storage box for an automobile of claim 2, wherein when a point at which the supporting member contacts the rotating body is defined as a third hinge point, a length of an upper portion of the box door from the first hinge point as a starting point, is determined to satisfy [Resultant Equation 2] below, such that the upper portion of the box door is prevented from interfering with the box housing $$\frac{a}{\cos\alpha} + d = \left(C_0 + \frac{D_2}{D_1}T - \frac{\gamma_0}{360}\cdot\pi D_2\right) \quad \text{[Resultant Equation 2]}$$

where a is an effective length of the bridge,
α is an angle between a straight line connecting the first hinge point and the third hinge point, and the bridge,
d is a straight line distance between the first hinge point and the second hinge point;
$C_0$ is an effective length of the supporting member,
$D_1$ is a diameter of the first gear,
$D_2$ is a diameter of the second gear,
T is a straight line length of the bridge withdrawn from the box housing,
$\gamma_0$ is an angle between the straight line connecting the first hinge point and the third hinge point, and the supporting member, and
π is an angle between the straight line connecting the first hinge point and the third hinge point, and a straight line connecting the first hinge point and the second hinge point, when the box door is maximally opened.

6. The storage box for an automobile of claim 2, wherein when a point at which the supporting member contacts the rotating body is defined as a third hinge point, and the bridge and the supporting member are disposed parallel to each other, with the box door in a closed state,
a length of an upper portion of the box door from the first hinge point as a starting point, is determined to satisfy [Resultant Equation 3] below, such that the upper portion of the box door is prevented from interfering with the box housing $$\frac{a}{\cos\alpha} + a\cdot\frac{\tan\alpha}{\cos\delta} = \left(C_0 + \frac{D_2}{D_1}T - \frac{\alpha}{360}\cdot\pi D_2\right) \quad \text{[Resultant Equation 3]}$$

where a is an effective length of the bridge,
α is an angle between a straight line connecting the first hinge point and the third hinge point, and the bridge,
δ is a slope angle at which a straight line connecting the first hinge point and the second hinge point, is sloped about the first hinge point,
$C_0$ is an effective length of the supporting member,
$D_1$ is a diameter of the first gear,
$D_2$ is a diameter of the second gear,
T is a straight line length of the bridge withdrawn from the box housing, and
π is an angle between the straight line connecting the first hinge point and the third hinge point, and the straight line connecting the first hinge point and the second hinge point, when the box door is maximally opened.

7. The storage box for an automobile of claim 1, wherein when a point at which the supporting member contacts the rotating body is defined as a third hinge point, and the bridge and the supporting member are disposed parallel to each other, with the box door in a closed state,
a diameter of the rotating body is determined to satisfy [Resultant Equation 4] below, such that an upper portion of the box door is prevented from interfering with the box housing $$a - (C_0 + T)\cdot\cos\alpha + \frac{a\pi}{360}\cdot\alpha\cdot\sin\alpha + a\cdot\frac{\sin\alpha}{\cos\delta} = 0 \quad \text{[Resultant Equation 4]}$$

where a is an effective length of the bridge,
$C_0$ is an effective length of the supporting member,
T is a straight line length of the bridge withdrawn from the box housing,
α is an angle between a straight line connecting the first hinge point and the third hinge point, and the bridge,
π is an angle between the straight line connecting the first hinge point and the third hinge point, and a straight line connecting the first hinge point and the second hinge point, when the box door is maximally opened, and
δ is a slope angle at which the straight line connecting the first hinge point and the second hinge point, is sloped about the first hinge point.

8. The storage box for an automobile of claim 1, wherein the supporting member is supported by the bridge, and becomes progressively thicker toward one end thereof to maintain engagement with the rotating body during opening and closing of the box door.

9. The storage box for an automobile of claim 1, wherein the bridge includes a supporting protrusion formed protruding thereon and supporting the supporting member to maintain the supporting member in engagement with the rotating body during opening and closing of the box door.

10. The storage box for an automobile of claim 1, wherein the supporting member includes:
a gear unit engaged with the rotating body; and
a coupling unit extending from the gear unit, bent at least once, and rotatably coupled to the second hinge point.

11. The storage box for an automobile of claim 10, wherein the coupling unit is disposed at an inside of the box door and supports the box door, when the box door is in an open state.

12. The storage box for an automobile of claim 1, wherein the box door is withdrawn from the box housing and opened upward by the bridge and the supporting member withdrawn from the box housing.

13. The storage box for an automobile of claim 1, wherein the box housing further includes a guider disposed thereon and guiding the sliding of the bridge.

* * * * *